Jan. 16, 1951

A. H. CLICK 2,538,640

UNITARY CLAMP FOR MULTIPLE SURFACES
IN FRICTIONAL ENGAGEMENT

Filed May 1, 1947

INVENTOR.
Aubrey H. Click
BY
ATTORNEY

UNITED STATES PATENT OFFICE 2,538,640

UNITARY CLAMP FOR MULTIPLE SURFACES IN FRICTIONAL ENGAGEMENT

Aubrey H. Click, Dallas, Tex.

Application May 1, 1947, Serial No. 745,136

1 Claim. (Cl. 81—41)

This invention relates to work holding devices and it has particular reference to a vise mounting constructed for universal adjustment.

The principal object of the invention is to provide a vise mounting so constructed that the work held by the vise may be disposed in any desired position by virtue of the provision for rotating the vise throughout a range of 360° on a vertical axis and substantially 180° on a horizontal axis without sacrifice of rigidity of the vise when secured in any plane.

Another object of the invention is to provide a universal vise mounting consisting of a circular base rotatably mounted on a fixed sub-base and provided with diametrically opposed standards in perpendicular relation to the rotatable base which are adapted to releasably support a horizontal shaft having a flattened area intermediate its ends. Upon the flattened area of the shaft is mounted a bearing plate having a shallow, coniform cavity therein which receives a conformable, annularly grooved boss on a companion plate which latter rigidly supports a vise. A bolt passes through the shaft, the center of the bearing plate and the companion plate to hold the latter against other than rotative movement with respect to the bearing plate.

Figure 1:
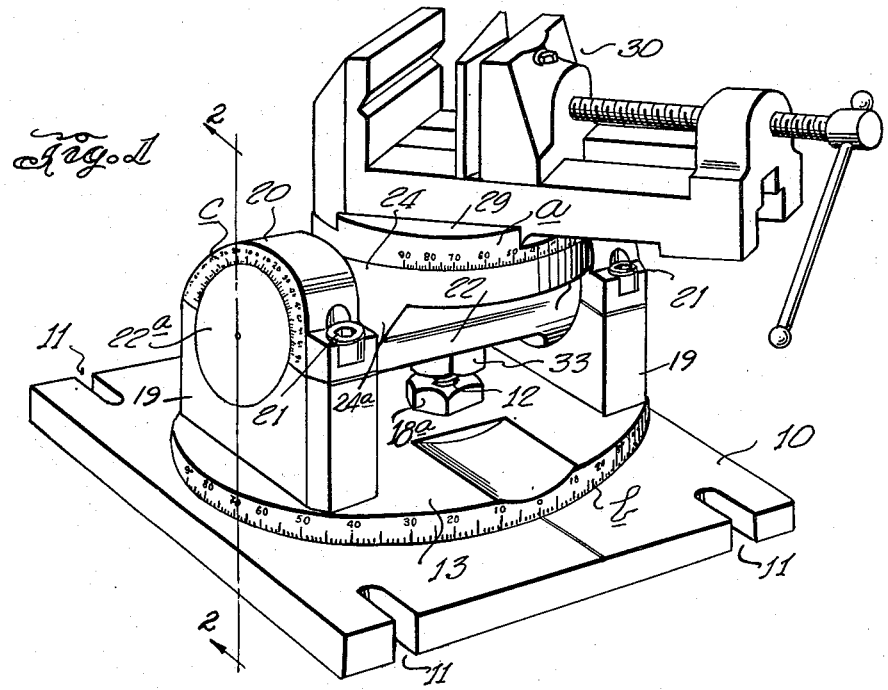
Figure 2:
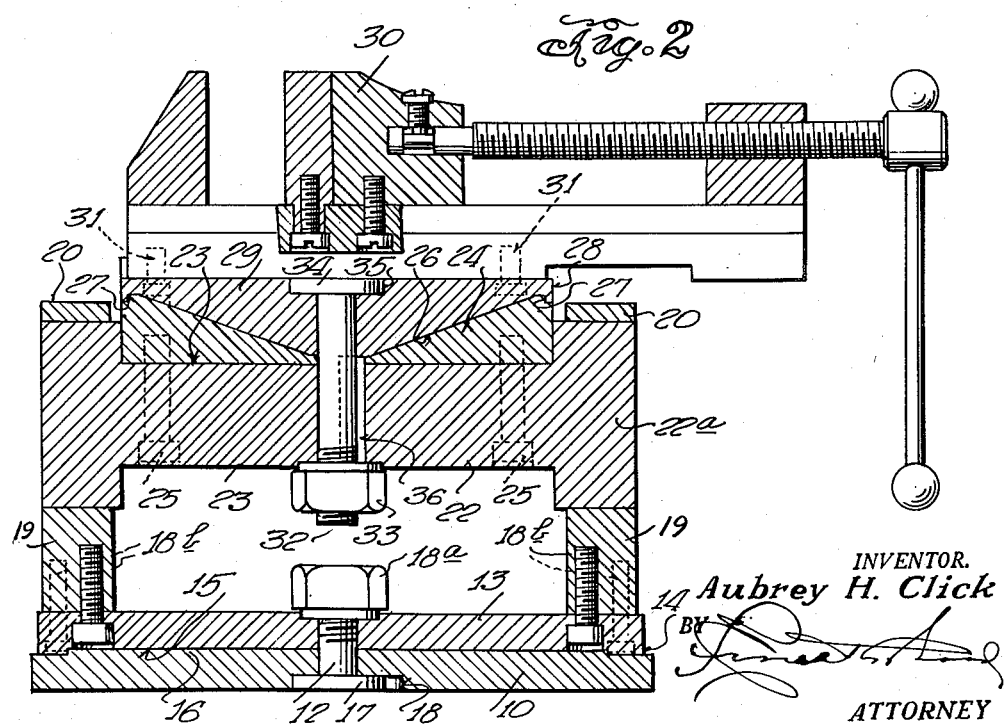

With the foregoing and other objects in view, the invention has particular reference to certain features of accomplishment, to become manifest as the description proceeds, taken in connection with the accompanying drawing wherein:

Figure 1 is a perspective view of a vise mounting constructed according to the invention, and Figure 2 is a side view in vertical section, as taken on the line 2—2 of Figure 1, but showing the vise portion as having been rotated counter-clockwise until it is parallel with the axis of the horizontal shaft.

Continuing with a more detailed description of the drawing, reference numeral 10 denotes a stationary sub-base plate, provided with holes on slots 11 for receiving screws or bolts by which the vise mounting is affixed to a table or bench.

Secured by means of a centrally disposed bolt 12 to the sub-base plate 10 is a circumferentially calibrated base 13, preferably circular in shape and provided with a peripherial flange 14 to define a circular cavity 15 in its undersurface which receives a correspondingly shaped boss 16 formed on the sub-base plate 10. The bolt 12 extends downwardly through a central opening in the sub-base plate 10 and carries a head 17 which lies in a recess 18 in the undersurface of plate 10. A nut 18a is mounted on the threaded upper end of bolt 12 to hold the members 10 and 13 in assembled relationship. The fact that the boss 16 of the plate 10 extends upwardly into the cavity 15 of the base 13 prevents metal cuttings from entering between the two plates and scoring the contiguous surfaces thereof.

Affixed by screws 18b and rising from the base plate 13 at diametrically opposite points on its periphery are standards 19, having friction caps 20, clamped to the standards by means of screws 21. The upper ends of the standards and the caps 20 thereof are shaped to define journal boxes for the ends 22a of a shaft 22. The shaft 22 has longitudinally flattened portions 23 on opposite sides thereof and mounted on the upper of these flattened portions is a bearing plate 24, preferably circular in shape. This plate has a boss 24a formed on its underside having downwardly convergent walls and is secured to the shaft 22 by means of screws 25 (Fig. 2) and further, the plate has a shallow, coniform cavity in its upper surface, about the perimeter of which is an annular shoulder 27. Disposed in the cavity 26 of the bearing plate 24 and having a circular flange 28 lying against the shoulder 27 of the said plate, is a mounting plate 29 for a vise 30, the latter being secured to the plate 29 by screws 31.

The plate 29 is held rotatably on the bearing plate 24 by a bolt 32 passing through centrally disposed, aligned holes in the shaft 22, and plates 24 and 29. A nut 33 is threaded into the lower end of the bolt 32 while a head 34 is provided on the opposite end thereof and lies in a circular cavity 35 in the upper face of the plate 29. A key 36 is disposed in a longitudinal slot in the bolt 32 to prevent rotation thereof with respect to the shaft 22 and bearing plate 24.

It is clearly apparent from the foregoing that the work held by the vise 30 may be oriented to any position within a 360° range, as determined by the circumferential calibrations $a$ on the perimeter of the plate 29, by loosening the nut 33 and again tightening the same after the work has been suitably positioned. Similarly, by loosening the nut 18a on the bolt 12, the entire mounting may be rotated 360° on the stationary sub-base 10, degrees of displacement being determined by circumferential calibrations $b$ on the perimeter of the base plate 13. Should it be desired to oscillate the vise on a horizontal axis, the set screws 21 are loosened to relieve pressure of the caps 20 on the shaft 24 whereupon the vise may be secured in any position in a vertical plane within the range of 180° to better present the work held by the vise to any operation. Calibrations $c$ on the caps 20 determine the degree of displacement of the vise in the vertical plane.

Manifestly, the construction as shown and described is capable of some modification and such modification as may be construed to fall within the scope and meaning of the appended claim is also considered to be within the spirit and intent of the invention.

What is claimed is:

A vise mounting comprising a stationary sub-base plate, a circular base plate rotatable thereon, spaced and parallel uprights secured to said base plate in diametrically opposed relationship, a shaft having a flat longitudinal side and having cylindrical end portions rotatably journaled in said uprights, a circular bearing plate having a flat side affixed to the flattened side of said shaft and having a concavity in its opposite side, a vise supporting plate having a convex face complementary to said concavity and rotatably disposed in said concavity, and a common means for collectively securing said shaft, vise supporting plate and bearing plate in adjusted positions.

AUBREY H. CLICK.

REFERENCES CITED

The following references are of record in the file of this patent:

UNITED STATES PATENTS

| Number | Name | Date |
| --- | --- | --- |
| 776,126 | Edlund | Nov. 29, 1904 |
| 797,579 | Hultgren | Aug. 22, 1905 |
| 1,269,271 | Fegley et al. | June 11, 1918 |
| 1,338,095 | Reid et al. | Apr. 27, 1920 |
| 1,511,298 | Petzold | Oct. 14, 1924 |
| 1,997,916 | Ruznak | Apr. 16, 1935 |
| 2,207,881 | Smith | July 16, 1940 |